United States Patent [19]

Terry et al.

[11] Patent Number: 5,711,383

[45] Date of Patent: Jan. 27, 1998

[54] CEMENTITIOUS WELL DRILLING FLUIDS AND METHODS

[75] Inventors: Dralen T. Terry, Duncan; Garland W. Davis, Comanche; Bobby J. King; Jiten Chatterji, both of Duncan; David D. Onan, Lawton; Patty L. Totten, Duncan, all of Okla.

[73] Assignee: Halliburton Company, Duncan, Okla.

[21] Appl. No.: 635,443

[22] Filed: Apr. 19, 1996

[51] Int. Cl.$^6$ ............................................. E21B 21/00
[52] U.S. Cl. ................................. 175/72; 166/295
[58] Field of Search .................... 175/65, 70, 72; 166/292, 293, 294, 295

[56] References Cited

U.S. PATENT DOCUMENTS

| | | | |
|---|---|---|---|
| 2,191,652 | 2/1940 | Hamilton, Jr. | 61/36 |
| 2,210,545 | 8/1940 | Hamilton, Jr. | 166/21 |
| 2,297,660 | 9/1942 | Mazee | 252/8.5 |
| 2,863,509 | 12/1958 | Messenger et al. | 166/29 |
| 2,945,769 | 7/1960 | Gama et al. | 106/98 |
| 3,642,509 | 2/1972 | Fujimasu | 106/428 |
| 4,280,915 | 7/1981 | Kercheville | 252/8.5 |
| 4,614,599 | 9/1986 | Walker | 175/72 X |
| 4,671,883 | 6/1987 | Connell et al. | 175/72 X |
| 4,696,698 | 9/1987 | Harriett | 106/74 |
| 4,696,699 | 9/1987 | Harriett | 106/74 |
| 4,784,223 | 11/1988 | Worrall et al. | 175/72 X |
| 4,797,158 | 1/1989 | Harriett | 106/74 |
| 4,797,159 | 1/1989 | Spangle | 106/89 |
| 4,816,551 | 3/1989 | Oehler et al. | 528/295.3 |
| 4,836,940 | 6/1989 | Alexander | 252/8.512 |
| 4,851,142 | 7/1989 | Scoggins et al. | 252/8.515 |
| 4,888,120 | 12/1989 | Mueller et al. | 252/8.551 |
| 4,889,747 | 12/1989 | Wilson | 427/221 |
| 4,957,166 | 9/1990 | Sydansk | 175/72 X |
| 5,071,575 | 12/1991 | House et al. | 507/104 |
| 5,076,944 | 12/1991 | Cowan et al. | 507/104 |
| 5,086,850 | 2/1992 | Harris et al. | 175/61 |
| 5,118,664 | 6/1992 | Burts, Jr. | 507/104 |
| 5,147,852 | 9/1992 | Cowan et al. | 507/104 |
| 5,295,543 | 3/1994 | Terry et al. | 166/293 |
| 5,314,022 | 5/1994 | Cowan et al. | 166/293 |
| 5,337,824 | 8/1994 | Cowan | 166/293 |
| 5,355,954 | 10/1994 | Onan et al. | 166/292 |
| 5,358,044 | 10/1994 | Hale et al. | 166/293 |
| 5,361,851 | 11/1994 | Hale et al. | 166/293 |
| 5,370,185 | 12/1994 | Cowan et al. | 175/72 X |
| 5,382,290 | 1/1995 | Nahm et al. | 106/789 |
| 5,383,521 | 1/1995 | Onan et al. | 166/293 |
| 5,398,758 | 3/1995 | Onan et al. | 166/292 |
| 5,495,891 | 3/1996 | Sydansk | 175/72 X |

*Primary Examiner*—William P. Neuder
*Attorney, Agent, or Firm*—Craig W. Roddy; C. Clark Dougherty, Jr.

[57] ABSTRACT

The present invention provides cementitious well drilling fluids and methods of drilling subterranean well bores. The drilling fluids are basically comprised of water, a water viscosity increasing material and a cementitious material which when deposited on the walls of the well bore as a part of the filter cake thereon consolidates the filter cake into a stable mass that readily bonds to a cementitious material slurry subsequently placed in the well bore. The methods of drilling a subterranean well bore are basically comprised of the steps of preparing a drilling fluid of the invention and drilling a subterranean well bore using the drilling fluid.

19 Claims, No Drawings

5,711,383

CEMENTITIOUS WELL DRILLING FLUIDS AND METHODS

BACKGROUND OF THE INVENTION

1. Field of the Invention

The present invention relates generally to improved drilling fluids and methods of drilling subterranean well bores therewith, and more particularly, to such drilling fluids and methods wherein cementitious materials contained in the drilling fluids are deposited on the walls of the well bores.

2. Description of the Prior Art

A variety of drilling fluids have been used heretofore in drilling subterranean well bores. The most commonly used such drilling fluids are solids-containing water based gels formed with clays and/or polymers which are often weighted with particulate weighting materials such as barite. When a well bore is being drilled, the drilling fluid is circulated downwardly through the drill string, through the drill bit and upwardly in the annulus between the walls of the well bore and the drill string. The drilling fluid functions to maintain hydrostatic pressure on formations penetrated by the well bore and thereby prevent blow-outs and to remove cuttings from the well bore. As the drilling fluid is circulated, a filter cake of solids from the drilling fluid forms on the walls of the well bore. The filter cake build-up is the result of initial fluid loss into permeable formations and zones penetrated by the well bore. The filter cake and gelled or partially gelled drilling fluid mixed therewith reduce or prevent additional fluid loss as the well is drilled.

After the well bore reaches its total depth, the drilling and circulation of drilling fluid are stopped. The well is then logged and a string of pipe is run into the well bore. After the pipe is run, the well bore is conditioned by circulating drilling fluid downwardly through the interior of the pipe and upwardly through the annulus. Primary cementing operations are then performed in the well bore, i.e., the string of pipe disposed in the well bore is cemented therein by placing a cement slurry in the annulus and allowing it to set into a hard substantially impermeable mass. When the cement slurry is run down the pipe and into the annulus, the drilling fluid in the pipe and the annulus is displaced therefrom.

The purpose of cementing the above mentioned string of pipe in the well bore is to provide physical support and positioning to the pipe and seal the annulus. That is, it is intended that the set cement in the annulus will bond to the pipe and to the walls of the well bore whereby the annulus is sealed in a manner which prevents pressurized fluid migration between subterranean zones and formations penetrated by the well bore.

The sealing of the annulus is often frustrated by the layers of solids contained in the filter cake and the gelled drilling fluid remaining on the walls of the well bore when the primary cementing operation is commenced. That is, when the cement slurry is placed in the annulus, thin layers of unconsolidated solids containing gelled drilling fluid often remain between the cement and the walls of the well bore including the faces of permeable formations or zones containing pressurized fluids. Since the inert layers of unconsolidated solids do not have the physical properties necessary to prevent pressurized fluid migration, such migration often takes place by way of flow channels formed through the layers.

While a variety of techniques have heretofore been developed in attempts to remove filter cake from the walls of well bores and increase the displacement efficiencies of gelled drilling fluids prior to cementing pipe therein, continuing needs remain for improved drilling fluids and methods of drilling. Such needs involve minimizing or preventing the existence of unconsolidated layers of filter cake on the walls of the well bore and/or modifying the drilling fluid to impart settable characteristics to the filter cake solids.

SUMMARY OF THE INVENTION

By the present invention improved drilling fluids and methods of utilizing the drilling fluids for drilling a subterranean well bore are provided which meet the needs described above and overcome the shortcomings of the prior art. The drilling fluids of the present invention include as a component, a cementitious material which is deposited on the walls of the well bore as a part of the layers of filter cake thereon. During the drilling of the well bore and/or subsequent thereto, the cementitious material is activated and caused to harden whereby the layers of filter cake are consolidated into stable masses to which additional cementitious material readily bonds. The consolidated filter cake layers have the physical properties required to prevent pressurized fluid migration in the annulus after the annulus is cemented.

The improved cementitious drilling fluids of this invention are basically comprised of water, a water viscosity increasing material and a cementitious material which when deposited on the walls of the well bore as a part of the filter cake layers thereon is activated and caused to hydrate and consolidate the filter cake into a stable mass that readily bonds to cementitious material subsequently placed in the well bore. Further, a portion of the drilling fluid can be utilized as the cementitious material subsequently placed in the well bore to seal the annulus.

The improved methods of the present invention for drilling a subterranean well bore are basically comprised of the steps of preparing a cementitious drilling fluid of this invention and drilling the well bore using the drilling fluid whereby the layers of filter cake on the walls of the well bore are consolidated into stable masses that readily bond to additional cementitious material subsequently placed in the well bore.

It is, therefore, a general object of the present invention to provide improved drilling fluids and methods of using the drilling fluids for drilling and cementing subterranean well bores.

A further object of the present invention is the provision of improved drilling fluids and methods of drilling well bores whereby when pipes are cemented in the well bores, good seals between the surfaces of the pipes, the set cement and the walls of the well bores result which prevent undesirable migration of fluids in the well bores.

Another object of the present invention is the provision of improved drilling fluids which function to stabilize the well bore and prevent or minimize the potential for lost circulation problems.

Other and further objects, features and advantages of the present invention will be readily apparent to those skilled in the art upon a reading of the description of preferred embodiments which follows.

DESCRIPTION OF PREFERRED EMBODIMENTS

The improved drilling fluids of this invention are basically comprised of water, a water viscosity increasing material and a cementitious material which when deposited on the walls of the well bore being drilled as a part of the filter cake hydrates and consolidates the filter cake into a stable mass which readily bonds to cementitious material subsequently placed in the well bore. The strength and other properties of the consolidated filter cake are sufficient to prevent or minimize the potential for lost circulation problems during drilling and to prevent fluid migration in the annulus after pipe is cemented in the well bore.

The water utilized for forming the drilling fluid can be fresh water, salt water, brine or seawater so long as the particular water used does not adversely react with other components in the drilling fluid.

The water viscosity increasing materials can be any of such materials utilized heretofore including hydratable polymers such as biopolymers, e.g., xanthan and welan; guar and derivatives, e.g., hydroxypropylguar; water soluble cellulose and derivatives, e.g., hydroxyethylcellulose, carboxymethylcellulose and carboxymethylhydroxyethylcellulose; acrylic acid and derivatives, e.g., partially hydrolyzed polyacrylamide; and/or uncalcined clays such as bentonite, attapulgite or sepiolite. The polymer and/or clay utilized forms a gel with the water in the drilling fluid thereby increasing the viscosity of the drilling fluid. The increase in viscosity may be necessary for the drilling fluid to suspend solid particles such as the cementitious material used, cuttings produced by the drill bit, particulate weighting materials and the like. Generally, the polymer and/or clay utilized is combined with the drilling fluid in an amount in the range of from about 0.1 pounds to about 50 pounds per barrel of the drilling fluid.

A variety of cementitious materials can be utilized in the drilling fluid in accordance with this invention. For example, the cementitious material may be any of the various hydraulic cements which are commonly utilized, both normal particle size and fine particle size. Examples of some of such cements are blast furnace slag, Portland cement and mixtures thereof. Portland cements are classified by the American Society of Testing Materials (ASTM) into five major types identified by the Roman numerals I–V, and by the American Petroleum Institute (API) into eight categories identified by the letters A–H. The classifications are based on chemical composition and physical properties. The API Portland cements are described and identified in the *API Specification For Materials and Testing For Well Cements*, API Specification 10, 21st Edition, dated Sep. 1, 1991 of the American Petroleum Institute, Washington, D.C.

Other cementitious materials which can also be utilized include ASTM Class C fly ash and ASTM Class F fly ash combined with an activator, a calcined clay combined with an activator and a silicious containing substance combined with an activator. Generally, any particulate cementitious material or combination of materials which in the presence of water will form a hard cementitious mass of sufficient strength and other properties can be utilized. If the cementitious material or combination of materials is self activating, a set retarder will generally also be required to prevent hardening of the material until after it has been deposited on the walls of the well bore being drilled.

Fly ash is the finely divided residue that results from the combustion of ground or powdered coal and is carried by the flue gases generated. A particular type of fly ash useful in accordance with the present invention is ASTM Class C or the equivalent fly ash which itself contains sufficient lime (about 12 to 15% by weight) to harden and form a cementitious mass in the presence of water.

Another fly ash suitable for use in accordance with the present invention is ASTM Class F or the equivalent fly ash which contains only a small amount of lime, i.e., an amount equal to or less than about 3% by weight. The ASTM Class F fly ash is combined with an activator such as a hydraulic cement, lime or an alkali which causes it to set into a cementitious mass in the presence of water. Hydraulic cements activate the Class F fly ash by producing lime when they hydrate and set. The term "alkali" is used herein to mean an alkali metal oxide or hydroxide.

Another cementitious material that can be utilized is a calcined clay combined with an activator such as a hydraulic cement, lime or an alkali. Examples of calcined clays which can be utilized include calcined kaolinites, calcined montmorillonites, calcined palygorskites, calcined illites and calcined opaline minerals.

Yet another cementitious material which can be utilized is comprised of a silicious containing substance combined with an activator such as a hydraulic cement, lime or an alkali. Suitable silicious containing substances include silicates, amorphous silica, e.g., fumed silica and colloidal silica, rice hull ash, zeolites and volcanic glass.

The cementitious materials or combinations of materials described above are self activating in that after being deposited on the walls of the well bore as part of the filter cake thereon, they hydrate and consolidate the filter cake into a stable mass. However, as mentioned above, the self activating materials must not hydrate and set until they have been deposited on the walls of the well bore being drilled. In order to provide sufficient time before hydration, a set retarder can be combined with the self activating cementitious materials or combination of materials. Set retarders are well known to those skilled in the art. Examples of set retarders which can be used with the cementitious materials described herein are lignosulfonates or derivatized lignosulfonates, hydroxycarboxy acids, phosphonic acid derivatives, polymers such as cellulosic derivatives, acrylic acid polymers and polyacrylamide. Generally, the particular set retarder which should be used with a particular cementitious material and its amount can be determined by conducting thickening time tests in accordance with the test procedures described in the above identified API Specification 10.

Cementitious materials which are not self activating can also be utilized in accordance with this invention. For example, the cementitious material can consist of ASTM Class F fly ash, a calcined clay of the type described above or a silicious containing substance of the type described above which is not combined with an activator or set retarder. After the non-self activating cementitious material has been deposited on the walls of the well bore as a part of the filter cake, it is caused to hydrate and set by contacting it with an activator such as lime or an alkali. The lime and alkali can be produced by the hydraulic cement slurry placed in the annulus during primary cementing operations after the well bore has been drilled (the hydrating hydraulic cement produces lime and alkali which in turn cause the non-self activating cementitious materials to hydrate and set). Alternatively, an aqueous solution of lime and/or alkali can be periodically swept through the well bore during drilling to activate the cementitious material.

As mentioned, the improved drilling fluids and methods of this invention stabilize a well bore being drilled by causing the filter cake deposited on the walls of the well bore to be consolidated into a stable cementitious mass. This not only provides a surface to which subsequently placed cementitious material used for primary cementing readily bonds and prevents undesirable formation fluid migration in the cemented annulus, it also prevents or minimizes drilling fluid lost circulation problems during drilling. That is, the consolidated filter cake deposited on the walls of the well bore during drilling fills and plugs zones of lost circulation encountered such as unconsolidated zones, highly permeable zones, naturally fractured zones, hydrostatic pressure induced fractured zones and the like.

A particularly suitable drilling fluid for use in accordance with the present invention is comprised of water selected from the group consisting of fresh water, salt water, brines and seawater, a water viscosity increasing material selected from the group consisting of a hydratable polymer or uncalcined clay present in an amount in the range of from about 0.1 pounds to about 50 pounds per barrel of said drilling fluid and a cementitious material selected from the group consisting of a hydraulic cement, ASTM Class C fly ash, ASTM Class F fly ash, a calcined clay and a silicious containing substance present in an amount in the range of from about 5 pounds to about 250 pounds per barrel of the drilling fluid.

As mentioned, the cementitious materials can be used in combination with a set retarder and those which are not by themselves self activating can be utilized in combination with an activator or contacted when on the walls of the well bore by an activator.

In another aspect of the present invention, the cementitious material slurry used for cementing pipe, e.g., casing, in the well bore after the well bore has been drilled can be formed from all or part of the drilling fluid used to drill the well bore. That is, additional cementitious material and other components such as water and set retarder can be added to a portion of the drilling fluid of this invention to form the cementitious material slurry.

The improved methods of the present invention are basically comprised of the steps of preparing a drilling fluid of the present invention which forms a filter cake containing a cementitious material on the walls of a well bore that hydrates and consolidates into a stable mass, and then drilling the well bore using the drilling fluid. As mentioned, the cementitious material can be self activating but retarded whereby it will not set until it has been deposited on the walls of the well bore or it can be a non-self activating cementitious material. When a non-self activating cementitious material is used, the additional step of contacting the cementitious material with an activator is performed. For example, the contacting step can comprise periodically sweeping an aqueous solution of an activator such as lime or alkali through the well bore in contact with the filter cake during drilling.

An alternate technique is to activate the non-self activating cementitious material deposited as a part of the filter cake on the walls of the well bore by conducting primary cementing operations and placing a cementitious material slurry in the well bore which produces lime and/or alkali when setting. The cementitious material slurry is allowed to set in contact with the filter cake whereby the lime or alkalies produced activate the cementitious material in the filter cake.

Regardless of the type of cementitious material used, i.e., the self activating type or non-self activating type, the methods of the present invention can include the additional steps of placing a string of pipe in the well bore, placing a cementitious material slurry in the annulus between the pipe and the walls of the well bore and allowing the slurry to set in the annulus. Because the filter cake is consolidated into a solid mass that readily bonds with the set cementitious material slurry, undesirable fluid migration in the annulus does not take place.

In order to further illustrate the cementitious well drilling fluids and methods of the present invention, the following examples are given.

EXAMPLE 1

Test samples of an improved drilling fluid of the present invention (test sample No. 1) and primary cementing fluids formed from the drilling fluid (test samples Nos. 2–8) were prepared. The drilling fluid test sample included a calcined clay cementitious material, an uncalcined clay viscosity increaser, fresh water, a set retarder, weighting material and simulated drill solids. The primary cementing fluids additionally included a hydrated lime activator, additional viscosity increasers, and a dispersing agent as shown in Table I below.

Each of test samples Nos. 1–3 were tested for rheological properties at room temperature in accordance with the procedure set forth in the above mentioned API Specification 10. Test samples 2–8 were also tested for thickening times and 24 hour compressive strengths in accordance with the procedures described in API Specification 10. The results of these tests are set forth in Tables II and III below.

TABLE I

| Density (pounds per gallon) And Components | Calcined Clay Drilling Fluid And Primary Cementing Formulations | | | | | | | |
|---|---|---|---|---|---|---|---|---|
| | Drilling Fluid Formulation Without Activator, | Primary Cementing Formulations Formed From The Drilling Fluid Formulation | | | | | | |
| (pounds per barrel) | Fluid No. 1 | Fluid No. 2 | Fluid No. 3 | Fluid No. 4 | Fluid No. 5 | Fluid No. 6 | Fluid No. 7 | Fluid No. 8 |
| Density | 10 | 12 | 12.5 | 11.5 | 11.5 | 11.5 | 11.8 | 11.5 |
| Weighting Material[1] | 57 | 42.8 | 25.4 | 49 | 49 | 49 | 46 | 49 |
| Uncalcined Clay Viscosity Increaser[2] | 20 | 15 | 6.5 | 25 | 25 | 25 | 24 | 25 |
| Simulated Drill Solids[3] | 15 | 11.3 | 9.8 | 13 | 13 | 13 | 12 | 13 |

TABLE I-continued

Calcined Clay Drilling Fluid And Primary Cementing Formulations

| Density (pounds per gallon) And Components (pounds per barrel) | Drilling Fluid Formulation Without Activator, Fluid No. 1 | Primary Cementing Formulations Formed From The Drilling Fluid Formulation | | | | | | |
|---|---|---|---|---|---|---|---|---|
| | | Fluid No. 2 | Fluid No. 3 | Fluid No. 4 | Fluid No. 5 | Fluid No. 6 | Fluid No. 7 | Fluid No. 8 |
| Fluid Loss Agent and Viscosity Increaser[4] | — | — | 0.5 | — | — | — | — | — |
| Polymer Viscosity Increaser[5] | — | — | 0.1 | — | 0.2 | — | — | — |
| Set Retarder[6] | 10 | 9.3 | 2 | 4.2 | 10.6 | 3.8 | — | 6.3 |
| Dispersant[7] | — | — | 2.5 | — | — | — | 7 | — |
| Calcined Clay Cementitious Material[8] | 10 | 107.5 | 208 | 88 | 88 | 88 | 103 | 88 |
| Activator[9] | — | 53 | 101 | 44 | 44 | 44 | 52 | 44 |
| Fresh Water | 311.4 | 233.6 | 212.3 | 263 | 260 | 263 | 249 | 262 |

[1]Barium Sulfate
[2]Bentonite except for Fluid No. 3 which was Sepiolite.
[3]Calcium Montmorillonite
[4]Polyanionic Cellulose commercially available under the trade name "DRISPAC SL" from Drilling Specialties Co. of Houston, Texas.
[5]Welan gum
[6]Lignosulfonate
[7]"CFR-2" commercially available from Halliburton Energy Services of Duncan, Oklahoma.
[8]Kaolin commercially available from ECC International of Atlanta, Georgia.
[9]Hydrated lime

TABLE II

Rheological Properties Of Fluids Nos. 1-3

| | Rheological Properties At Room Temperature | | | | | |
|---|---|---|---|---|---|---|
| Fluid No.[1] | 600 rpm | 300 rpm | 200 rpm | 100 rpm | 6 rpm | 3 rpm |
| 1 | 9 | 5 | 4 | 3 | 1 | 1 |
| 2 | 93 | 68 | 57 | 45 | 22 | 15 |
| 3 | 562 | 376 | 288 | 190 | 60 | 36 |

[1]Corresponding Fluid Nos. and formulations given in Table I above.

TABLE III

Thickening Times And Compressive Strengths Of Fluids Nos. 2-8

| | Thickening Time (hr:min) | | | | 24 Hr. Compressive Strength (psi) | |
|---|---|---|---|---|---|---|
| Fluid No.[1] | 100° F. | 120° F. | 150° F. | 200° F. | 120° F. | 200° F. |
| 2 | — | — | — | 1:00 | — | — |
| 3 | — | — | — | — | 1318 | — |
| 4 | — | — | — | 1:04 | — | — |
| 5 | — | — | — | 1:03 | — | — |
| 6 | 9:15 | — | — | — | — | — |
| 7 | — | 13:50 | — | — | — | — |
| 8 | — | — | 4:05 | — | — | 466 |

[1]Corresponding Fluid Nos. and formulations given in Table I above.

As shown in Table II, the drilling fluid (test sample No. 1) and the primary cementing fluid formed therefrom (test sample No. 2) had excellent rheological properties. As shown by the difference in test samples 2 and 3, the rheological properties can be increased by adding additional viscosity increasing polymers.

As is shown in Table III, the primary cementing fluids formed from the drilling fluid had varying thickening times and compressive strengths depending on the particular components and quantities of components contained therein.

EXAMPLE 2

Test samples of three drilling fluids of the present invention (test sample Nos. 1-3) and two primary cementing fluids formed therefrom (test sample Nos. 4 and 5) were prepared. The drilling fluid test samples all included API Class H Portland cement, water, simulated drill solids and weighting material. Two of the drilling fluids (Nos. 2 and 3) included a viscosity increaser. The primary cementing fluids formed from the drilling fluid included increased quantities of Portland cement and a set accelerator, all as shown in Table IV below.

TABLE IV

Cement Drilling Fluid And Primary Cementing Formulations

| Density (pounds per gallon) And Components | Drilling Fluid Formulations | | | Primary Cementing Formulations Formed From Drilling Fluid Formulation No. 1 | |
|---|---|---|---|---|---|
| (pounds per barrel) | Fluid No. 1 | Fluid No. 2 | Fluid No. 3 | Fluid No. 4 | Fluid No. 5 |
| Density | 9.5 | 9.5 | 9.5 | 12.5 | 12.5 |
| Fresh Water | 332 | 330 | 328 | 262 | 264 |
| Cementitious Material[1] | 10 | 10 | 10 | 196 | 196 |
| Simulated Drill Solids[2] | 15 | 15 | 15 | 12 | 12 |
| Weighting Material[3] | 40 | 40 | 40 | 33 | 33 |
| Fluid Loss Agent and Viscosity Increaser[4] | — | 2 | 3 | 2.4 | 1.6 |

TABLE IV-continued

Cement Drilling Fluid And Primary Cementing Formulations

| Density (pounds per gallon) And Components | Drilling Fluid Formulations | | | Primary Cementing Formulations Formed From Drilling Fluid | |
|---|---|---|---|---|---|
| (pounds per barrel) | Fluid No. 1 | Fluid No. 2 | Fluid No. 3 | Formulation No. 1 | |
| | | | | Fluid No. 4 | Fluid No. 5 |
| Set Accelerator[5] | — | — | — | 2.4 | 2.4 |

[1]API Class H Portland Cement
[2]Calcium Montmorillonite
[3]Barium Sulfate
[4]Hydroxyethylcellulose
[5]Calcium Chloride The drilling fluids were placed in aging cells and rolled in a roller oven to simulate the circulation of the fluids through a well bore being drilled for various time periods. After aging, the rheological properties of the fluids at room temperature were determined. The rheological properties at room temperature of the primary cementing fluid were also determined. The results of these tests are given in Table V below.

TABLE V

Rheological Properties Of Fluids Nos. 1–5

| Fluid No.[1] | Simulated Circulating Time[2], Hrs. | Rheological Properties At Room Temperature | | | | | |
|---|---|---|---|---|---|---|---|
| | | 600 rpm | 300 rpm | 200 rpm | 100 rpm | 6 rpm | 3 rpm |
| 1 | 0 | 7 | 3 | 2 | 1 | 0.5 | 0.5 |
| 1 | 16 | 8 | 3 | 2 | 1 | 0.5 | 0 |
| 1 | 32 | 5 | 2 | 1.5 | 1 | 0.5 | 0 |
| 1 | 48 | 7 | 3 | 2 | 1 | 0.5 | 0 |
| 2 | 16 | 73 | 54 | 44 | 30 | 5 | 3 |
| 3 | 16 | 142 | 118 | 99 | 76 | 19 | 12 |
| 4 | 0 | 90 | 70 | 59 | 45 | 11 | 7 |
| 5 | 0 | 175 | 144 | 128 | 103 | 36 | 25 |

[1]Corresponding Fluid Nos. and formulations given in Table IV above.
[2]Rolled in an aging cell in a Baroid laboratory roller oven sold by Baroid Testing Equipment Co. of Houston, Texas, which simulates fluid aging under pressure and temperature over periods of time.

Each of test samples Nos. 2 and 3 were tested for fluid loss and each of test samples Nos. 4 and 5 were tested for thickening time and compressive strength, all in accordance with the procedures set forth in API Specification 10. The results of these tests are set forth in Table VI below.

TABLE VI

Fluid Losses, Thickening Times And Compressive Strengths Of Fluids Nos. 2–5

| Fluid No.[1] | Fluid Loss, 1000 psi | | Thickening Time | | Compressive Strength | |
|---|---|---|---|---|---|---|
| | °F. | cc/30 min. | °F. | Hr:min | °F. | 24 Hr. |
| 2 | 80 | 24 | — | — | — | — |
| 3 | 80 | 18 | — | — | — | — |
| 4 | — | — | 150 | 19:00+ | 150 | 255 |
| 5 | — | — | 150 | 19:00+ | 100 | 179 |

[1]Corresponding Fluid Nos. and formulations given in Table IV above.

As shown in Table V, the rheological properties of drilling fluid sample No. 1 stayed relatively constant over a long simulated circulation time thereby indicating excellent drilling fluid performance. Drilling fluid test samples Nos. 2 and 3 showed more variance in rheological properties as a result of circulating time due to the presence of viscosity increaser therein.

As shown in Table VI, the primary cementing fluids formed from the drilling fluid have excellent thickening time and compressive strength properties.

EXAMPLE 3

Test samples of drilling fluids of the present invention (test sample Nos. 1–6) and primary cementing fluids (test sample Nos. 7–9) were prepared. The drilling fluid and primary cementing fluid test samples included Class C fly ash cementitious material, fluid loss agents and viscosity increasers, weighting material (except No. 1), a dispersant, simulated drill solids, a set retarder and fresh water, all as shown in Table VII below.

TABLE VII

Class C Fly Ash Drilling Fluid And Primary Cementing Formulations

| Density (pounds per gallon) and Components | Drilling Fluid Formulations | | | | | | Primary Cementing Formulations | | |
|---|---|---|---|---|---|---|---|---|---|
| (pounds per barrel) | Fluid No. 1 | Fluid No. 2 | Fluid No. 3 | Fluid No. 4 | Fluid No. 5 | Fluid No. 6 | Fluid No. 7 | Fluid No. 8 | Fluid No. 9 |
| Density | 9.5 | 11.0 | 11.5 | 12.0 | 12.5 | 13.5 | 12.5 | 13.5 | 15.0 |
| Fresh Water | 317 | 288 | 281 | 264 | 240 | 220 | 252 | 235 | 196 |
| Cementitious Material[1] | 59 | 125 | 128 | 190 | 216 | 232 | 218 | 237 | 275 |
| Simulated Drill Solids[2] | 15 | 15 | 12 | 15 | 11 | 15 | 15 | 15 | 11 |
| Weighting Material[3] | — | 29 | 56 | 31 | 26 | 65 | 35 | 74 | 120 |
| Fluid Loss Agent and | 2.0 | — | 1.9 | 2.5 | 2.4 | 2.1 | 1.7 | 1,5 | 2.0 |

TABLE VII-continued

Class C Fly Ash Drilling Fluid And Primary Cementing Formulations

| Density (pounds per gallon) and Components (pounds per barrel) | Drilling Fluid Formulations | | | | | | Primary Cementing Formulations | | |
|---|---|---|---|---|---|---|---|---|---|
| | Fluid No. 1 | Fluid No. 2 | Fluid No. 3 | Fluid No. 4 | Fluid No. 5 | Fluid No. 6 | Fluid No. 7 | Fluid No. 8 | Fluid No. 9 |
| Viscosity Increaser[4] Polymer | 0.2 | 0.15 | — | — | — | — | — | — | — |
| Viscosity Increaser[5] | | | | | | | | | |
| Dispersant[6] | 0.5 | 0.5 | 1.0 | 2.0 | 2.3 | 2 | 2.3 | 3.2 | 4.0 |
| Set Retarder[7] | 4.6 | 5 | 10 | 8 | 25 | 30 | 2.5 | 3.0 | 4.2 |

[1]Class C Fly Ash
[2]Calcium Montmorillonite
[3]Barium Sulfate
[4]Hydroxyethylcellulose
[5]Welan gum
[6]"CFR-2" commercially available from Halliburton Energy Services of Duncan, Oklahoma.
[7]Hydroxycarboxy acid The rheological properties, thickening times and compressive strengths of a number of the fluids were tested in accordance with the procedures described in API Specification 10. The results of the tests are given in Tables VIII, IX and X below.

TABLE VIII

Rheological Properties Of Fluids

Rheological Properties At Room Temperature

| Fluid No.[1] | 600 rpm | 300 rpm | 200 rpm | 100 rpm | 6 rpm | 3 rpm |
|---|---|---|---|---|---|---|
| 1 | 9 | 6 | 5 | 4 | 2 | 1 |
| 2 | 18 | 10 | 9 | 5 | 2 | 2 |
| 3 | 38 | 27 | 23 | 17 | 15 | 12 |
| 4 | 62 | 46 | 41 | 35 | 29 | 26 |
| 6 | 108 | 87 | 76 | 59 | 33 | 21 |
| 8 | 205 | 96 | 57 | 23 | 2 | 1 |
| 9 | 236 | 120 | 77 | 38 | 3 | 2 |

[1]Corresponding Fluid Nos. and formulations given in Table VII above.

TABLE IX

Thickening Times Of Fluids

Thickening Times (Hr:Min)

| Fluid No.[1] | 100° F. | 120° F. | 180° F. | 200° F. |
|---|---|---|---|---|
| 1 | 7:00+ | 6:00+ | — | — |
| 2 | — | — | 5:30 | 1:42 |
| 5 | — | — | 6:00+ | — |
| 7 | — | 3:00+ | 2:12 | — |
| 8 | 3:00+ | 4:10 | 1:40 | — |

[1]Corresponding Fluid Nos. and formulations given in Table VII above.

TABLE X

Compressive Strengths Of Primary Cementing Fluids

24 Hr. Compressive Strength (psi)

| Fluid No.[1] | 100° F. | 150° F. | 200° F. |
|---|---|---|---|
| 7 | — | 130 | 410 |
| 8 | 95 | 265 | — |
| 9 | 535 | 1,015 | — |

[1]Corresponding Fluid Nos. and formulations given in Table VII above.

As shown in Tables VIII, IX and X, the fly ash drilling fluids of this invention have excellent theological properties and thickening times. Also, the primary cementing fluids formed from the drilling fluids have good compressive strengths.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. An improved drilling fluid for use in drilling a subterranean well bore which forms fluid loss reducing filter cake on the walls of the well bore comprising:
   water;
   a water viscosity increasing material selected from the group of hydratable polymers, uncalcined clays and mixtures thereof; and
   a cementitious material which when deposited on the walls of said well bore as a part of said filter cake is caused to harden and consolidate said filter cake into a stable mass that readily bonds to cement used for primary cementing subsequently placed in said well bore.

2. The drilling fluid of claim 1 wherein said cementitious material is a self activating material which hydrates and consolidates said filter cake after being deposited on the walls of said well bore.

3. The drilling fluid of claim 2 wherein said cementitious material is selected from the group consisting of a hydraulic cement combined with a set retarder, ASTM Class C fly ash combined with a set retarder, ASTM Class F fly ash combined with a set retarder and an activator selected from the group consisting of hydraulic cement, lime and an alkali, a calcined clay which forms a cementitious material combined with a set retarder and an activator selected from the group consisting of a hydraulic cement, lime and an alkali, and a siliceous containing substance which forms a cementitious material combined with a set retarder and an activator selected from the group consisting of a hydraulic cement, lime and an alkali.

4. The drilling fluid of claim 1 wherein said cementitious material is activated externally after being deposited on the walls of said well bore by contacting the cementitious material with an activator.

5. The drilling fluid of claim 4 wherein said cementitious material is selected from the group consisting of ASTM Class F fly ash, a calcined clay and a siliceous containing substance.

6. The drilling fluid of claim 5 wherein said activator is selected from the group consisting of a hydraulic cement, lime and an alkali.

7. The drilling fluid of claim 1 wherein said water is selected from the group consisting of fresh water, salt water, brines and seawater.

8. The drilling fluid of claim 1 wherein said viscosity increasing material is present in an amount in the range of from about 0.1 pounds to about 50 pounds per barrel of said drilling fluid.

9. The drilling fluid of claim 1 wherein said cementitious material is present in an amount in the range of from about 5 pounds to about 250 pounds per barrel of said drilling fluid.

10. An improved method of drilling a subterranean well bore comprising the steps of:

preparing a drilling fluid which forms a filter cake on the walls of the well bore as said well bore is drilled comprised of water, a water viscosity increasing material selected from the group of hydratable polymers, uncalcined clays and mixtures thereof and a cementitious material which when deposited on the walls of said well bore as a part of said filter cake is caused to hydrate and consolidate said filter cake into a stable mass that readily bonds to cementitious material used for primary cementing subsequently placed in said well bore; and drilling said well bore using said drilling fluid.

11. The method of claim 10 wherein said cementitious material is a self activating material which hydrates and consolidates said filter cake after being deposited on the walls of said well bore.

12. The method of claim 11 wherein said cementitious material is selected from the group consisting of a hydraulic cements combined with a set retarder, ASTM Class C fly ash combined with a set retarder, ASTM Class F fly ash combined with a set retarder and an activator selected from the group consisting of a hydraulic cement, lime and an alkali, a calcined clay which forms a cementitious material combined with a set retarder and an activator selected from the group consisting of a hydraulic cement, lime and an alkali, and a siliceous containing substance which forms a cementitious material combined with a set retarder and an activator selected from the group consisting of a hydraulic cement, lime and an alkali.

13. The method of claim 10 wherein said cementitious material is activated externally after being deposited on the walls of said well bore by contacting the cementitious material with an activator.

14. The method of claim 13 wherein said cementitious material is selected from the group consisting of ASTM Class F fly ash, a calcined clay and a siliceous containing substance, and said activator is selected from the group consisting of a hydraulic cement, lime and an alkali.

15. The method of claim 10 wherein said water viscosity increasing material is present in an amount in the range of from about 0.1 pounds to about 50 pounds per barrel of said drilling fluid.

16. The method of claim 10 wherein said cementitious material is present in an amount in the range of from about 5 pounds to about 250 pounds per barrel of said drilling fluid.

17. The method of claim 10 wherein said water is selected from the group consisting of fresh water, salt water, brines and seawater.

18. The method of claim 10 which further comprises the steps of:

placing a pipe in said well bore;

placing a cementitious material slurry in the annulus between said pipe and the walls of said well bore; and allowing said cementitious material slurry to set in said annulus whereby it is bonded to said pipe and to the walls of said well bore by way of said consolidated filter cake thereon.

19. The method of claim 17 wherein said cementitious material slurry is comprised of a portion of said drilling fluid.

* * * * *